United States Patent
Vorias

(10) Patent No.: US 9,651,018 B2
(45) Date of Patent: May 16, 2017

(54) POWER GENERATING ASSEMBLY

(71) Applicant: Mihalis Vorias, St. Laurent (CA)

(72) Inventor: Mihalis Vorias, St. Laurent (CA)

(73) Assignee: Mihalis Vorias, St. Laurent (CA)

( * ) Notice: Subject to any disclaimer, the term of this patent is extended or adjusted under 35 U.S.C. 154(b) by 20 days.

(21) Appl. No.: 14/568,665

(22) Filed: Dec. 12, 2014

(65) Prior Publication Data

US 2015/0211475 A1  Jul. 30, 2015

Related U.S. Application Data

(60) Provisional application No. 61/933,554, filed on Jan. 30, 2014.

(51) Int. Cl.
| | | |
|---|---|---|
| *F03D 3/04* | (2006.01) | |
| *F03B 3/18* | (2006.01) | |
| *F03D 3/02* | (2006.01) | |
| *F03B 17/06* | (2006.01) | |
| *F03D 9/25* | (2016.01) | |

(52) U.S. Cl.
CPC .............. *F03B 3/18* (2013.01); *F03B 17/063* (2013.01); *F03D 3/02* (2013.01); *F03D 3/0427* (2013.01); *F03D 9/255* (2017.02); *F05B 2210/16* (2013.01); *F05B 2240/133* (2013.01); *Y02E 10/28* (2013.01); *Y02E 10/74* (2013.01)

(58) Field of Classification Search
CPC ........ F03B 17/063; F03D 3/02; F03D 3/0427; F05B 2240/133
USPC ........................ 290/44, 55; 415/2.1, 4.1, 4.3
See application file for complete search history.

(56) References Cited

U.S. PATENT DOCUMENTS

| | | | | |
|---|---|---|---|---|
| 974,221 | A | * | 11/1910 | Wilber .................. F03B 17/061 |
| | | | | 415/60 |
| 1,350,265 | A | * | 8/1920 | Recuero ................ F03B 17/065 |
| | | | | 415/146 |
| 2,379,324 | A | * | 6/1945 | Topalov ................ F03B 17/065 |
| | | | | 415/24 |
| 4,012,163 | A | | 3/1977 | Baumgartner et al. |
| | | | | (Continued) |

FOREIGN PATENT DOCUMENTS

| | | |
|---|---|---|
| CA | 1098831 | 4/1981 |
| CA | 2330700 | 1/2001 |

(Continued)

OTHER PUBLICATIONS

International Seach Report for PCT Application PCT/CA2015/050068 (WO2015113159).

*Primary Examiner* — Julio C Gonzalez

(57) ABSTRACT

A power generating assembly for generating electricity from a flowing medium includes an enclosure. The enclosure includes an elongated duct along which the medium flows. The duct defines a longitudinal direction and a lateral direction. The duct includes a converging inlet nozzle having a span in the lateral direction. At least one pair of turbines is arranged within and on either side of the duct in the lateral direction. The turbines are rotated in opposite directions by the flowing medium. The turbines have a span in the lateral direction. The span of the converging inlet nozzle is at least the span of the at least one pair of turbines. A generator is interconnected with each turbine of the at least one pair of turbines via a drive means such that the generator rotates with rotation of the turbines.

11 Claims, 7 Drawing Sheets

(56) References Cited

U.S. PATENT DOCUMENTS

| | | | |
|---|---|---|---|
| 4,084,918 A * | 4/1978 | Pavlecka | F03D 1/04 290/55 |
| 4,174,923 A * | 11/1979 | Williamson | F03D 3/02 415/211.1 |
| 4,571,152 A | 2/1986 | Tatar | |
| 5,375,968 A | 12/1994 | Kollitz et al. | |
| 5,969,430 A * | 10/1999 | Forrey | F03D 3/0463 290/44 |
| 6,109,863 A | 8/2000 | Milliken | |
| 6,191,496 B1 | 2/2001 | Elder | |
| 6,674,181 B2 * | 1/2004 | Harbison | F03D 3/02 290/44 |
| 6,734,576 B2 | 5/2004 | Pacheco | |
| 6,765,309 B2 | 7/2004 | Tallal, Jr. et al. | |
| 6,841,894 B2 | 1/2005 | Gomez Gomar | |
| 6,860,720 B2 | 3/2005 | Nagy | |
| 6,981,839 B2 | 1/2006 | Fan | |
| 7,215,037 B2 | 5/2007 | Scalzi | |
| 7,466,035 B1 * | 12/2008 | Srybnik | F03B 17/063 290/43 |
| 7,488,150 B2 | 2/2009 | Krippene | |
| 8,240,977 B2 | 8/2012 | Gornatti | |
| 8,348,623 B2 | 1/2013 | Wasshus et al. | |
| 8,419,346 B2 | 4/2013 | Attey | |
| 8,556,571 B2 | 10/2013 | Cassidy | |
| 8,616,830 B2 * | 12/2013 | Unno | F03B 3/183 290/43 |
| 8,664,784 B2 | 3/2014 | Janca et al. | |
| 8,791,588 B2 | 7/2014 | Steinlechner | |
| 8,823,201 B1 | 9/2014 | Al-Wasis | |
| 8,827,631 B2 | 9/2014 | Achard et al. | |
| 2003/0209911 A1 | 11/2003 | Pechler | |
| 2009/0096211 A1 * | 4/2009 | Stiesdal | H02J 3/1835 290/44 |
| 2010/0213722 A1 | 8/2010 | Scott | |
| 2010/0215488 A1 | 8/2010 | Santoro | |
| 2010/0270804 A1 | 10/2010 | Datel | |
| 2011/0135443 A1 * | 6/2011 | Cucci | F03D 3/02 415/1 |
| 2011/0305563 A1 | 12/2011 | Saunders, III | |
| 2012/0141249 A1 | 6/2012 | Carlson | |
| 2014/0017070 A1 | 1/2014 | Paggi | |
| 2014/0265335 A1 * | 9/2014 | Andreis | B63B 1/32 290/52 |

FOREIGN PATENT DOCUMENTS

| | | | |
|---|---|---|---|
| CA | 2633876 | 6/2008 | |
| CN | 2858992 | 1/2007 | |
| CN | 201050447 | 4/2008 | |
| CN | 102734061 | 10/2012 | |
| DE | 102005040806 | 3/2007 | |
| EP | 1744057 | 1/2007 | |
| FR | 2841605 | 1/2004 | |
| GB | 2313160 | 11/1997 | |
| VG | GB 2463313 A * | 3/2010 | F03B 3/16 |
| WO | 2007009155 | 1/2007 | |
| WO | 2007027113 | 3/2007 | |
| WO | 2009024714 | 2/2009 | |
| WO | 2009135247 | 11/2009 | |
| WO | 2010104475 | 9/2010 | |

* cited by examiner

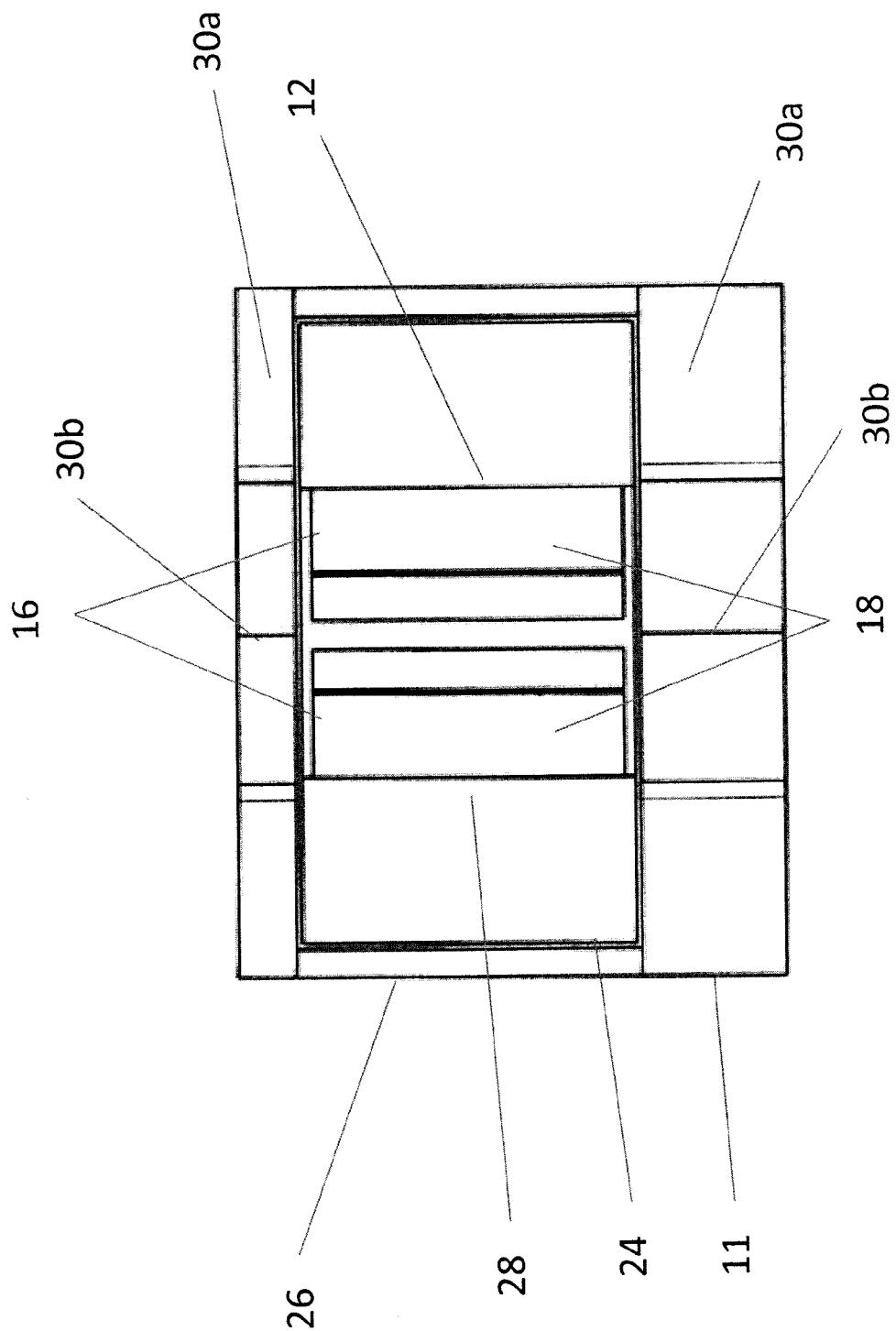

POWER GENERATING ASSEMBLY

CROSS-REFERENCE

The present application claims priority to U.S. Provisional Application No. 61/933,554 filed on Jan. 30, 2014 and entitled "POWER GENERATING ASSEMBLY", the entirety of which is incorporated herein by reference.

FIELD OF THE INVENTION

The present relates to power generating assemblies.

BACKGROUND

Wind turbines for generating electricity usually have a plurality of blades oriented radially outwardly from a spinning hub. The traditional wind turbines have long blades which may cause significant noise. Such turbines do not have enclosures which would cover the blades and reduce the noise. As a result, these turbines cannot typically be placed in proximity to homes or the like, otherwise they would disturb the residents nearby.

SUMMARY

A power generating assembly for generating electricity from a flowing medium is provided. The assembly comprises an enclosure including an elongated duct along which the medium flows, the elongated duct comprising a converging inlet nozzle and an outlet, the elongated duct defining a longitudinal direction and a lateral direction; at least one pair of turbines arranged within and on either side of the duct in the lateral direction between the inlet nozzle and the outlet, each turbine of the at least one pair of turbines rotating about a respective shaft, the shafts being parallel and extending in a transverse direction to the longitudinal direction and the lateral direction, the turbines being rotated in opposite directions by the flowing medium; and a generator interconnected with each turbine of the at least one pair of turbines via a drive means such that the generator rotates with rotation of the turbines.

A power generating assembly for generating electricity from a flowing medium, the assembly comprising: an enclosure including an elongated duct along which the medium flows, the elongated duct comprising a converging inlet nozzle and an outlet, the elongated duct defining a longitudinal direction and a lateral direction, the converging inlet nozzle having an inlet span at an inlet in the lateral direction; at least one pair of turbines arranged within the enclosure and on either side of the duct in the lateral direction between the inlet nozzle and the outlet, each turbine rotating about a respective shaft extending in a transverse direction, the transverse direction being perpendicular to the longitudinal direction and the lateral direction, the turbines being rotated in opposite directions by the flowing medium, the turbines being spaced from each other in the lateral direction such that a combined lateral span of the turbines being defined between ends of opposed blades of the turbines in the lateral direction, the inlet span being at least the combined lateral span of the at least one pair of turbines; and a generator interconnected with each turbine of the at least one pair of turbines via a drive means such that the generator rotates with rotation of the turbines.

BRIEF DESCRIPTION OF THE DRAWINGS

FIG. 1C provides a rear plan view of the power generating assembly of FIG. 1A;

DETAILED DESCRIPTION

Figure 1A:
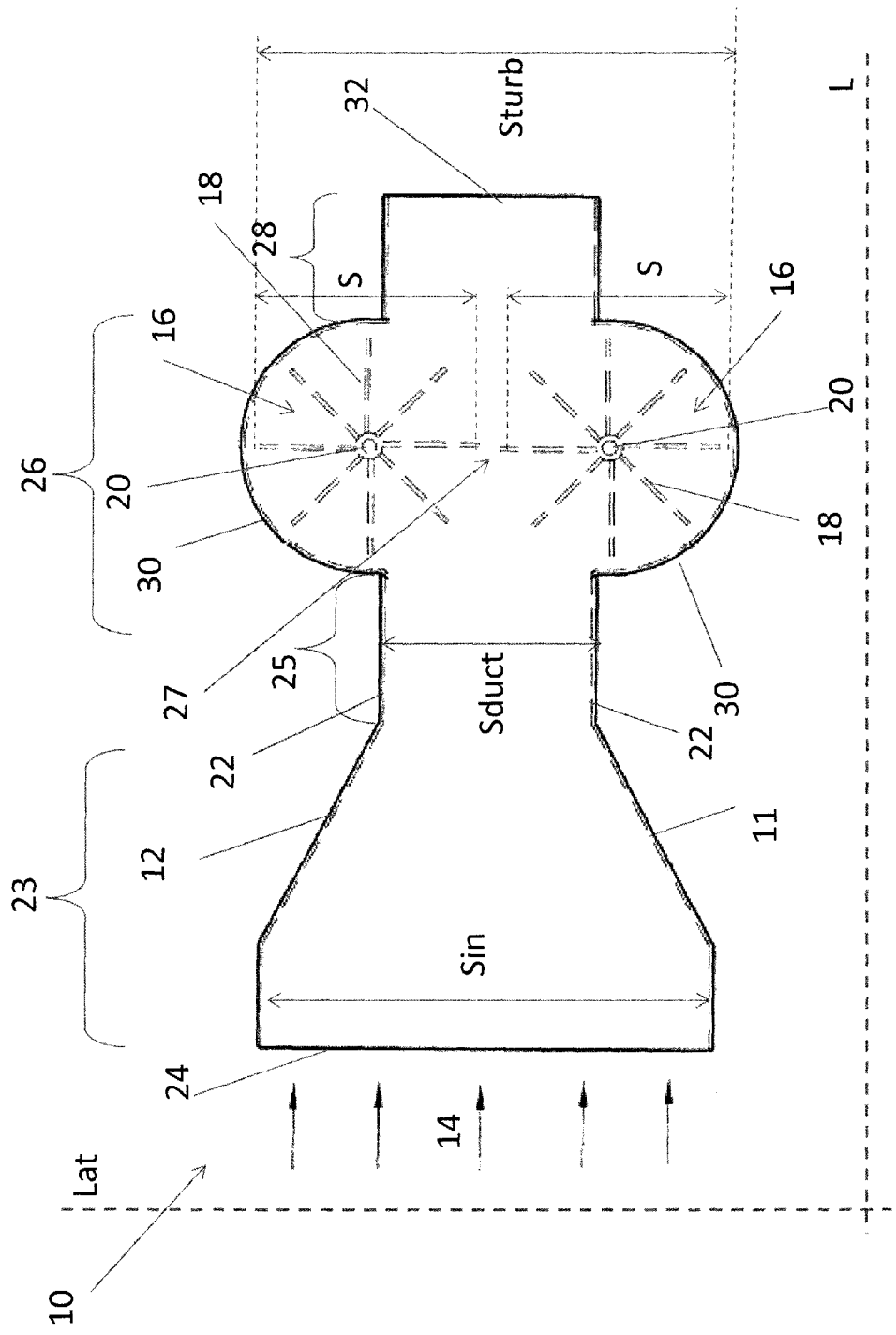
FIG. 1A provides a top cross-sectional view of a power generating assembly in accordance with an illustrative embodiment.
Figure 1B:
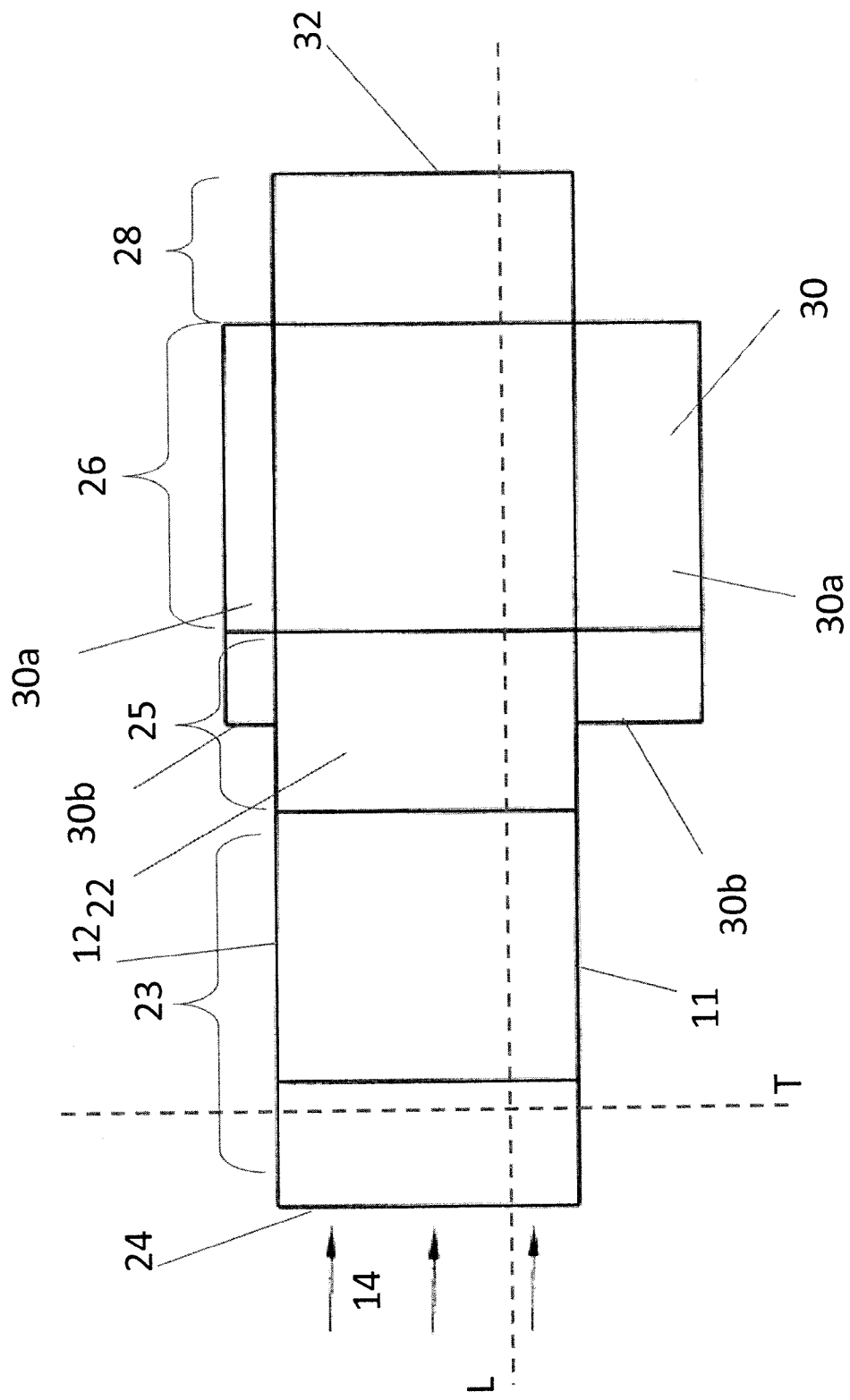
FIG. 1B provides a side plan view of the power generating assembly of FIG. 1A.

Referring to FIGS. 1A, 1B and 1C, a power generating assembly in accordance with an illustrative embodiment will be described. The power generating assembly, generally referred to using the reference numeral 10, comprises an enclosure 11 including an elongated duct 12 through which a flowing medium 14 such as wind/air flows. Two turbines 16 each having a plurality of blades 18 are provided. The turbines 16 are placed inside the enclosure 11, partially into the duct 12. Placing the turbines 18 within an enclosure, such as the enclosure 11, which covers them completely except for the guided flow of medium 14 may reduce noise generated by the turbines 16. The turbines 16 rotate about corresponding turbine shafts 20. The shafts 20 form a hub for the blades 18 which extend radially therefrom. The turbine shafts 20 are arranged perpendicular to the length of, and on either side of, the elongated duct 12. Illustratively, the turbine shafts 20 are placed aligned with the sides 22 of the duct 12 such that about half of each turbine 16 projects into the duct 12. In another embodiment, the turbine shafts 20 could be placed slightly inwardly relative the sides 22 of the duct 12 such that more than half of each turbine 16 projects into the duct 12. In yet another embodiment, the turbine shafts 20 could be placed slightly outwardly relative the sides 22 of the duct 12 such that less than half of each turbine 16 projects into the duct 12. The duct 12 comprises a tapered or converging inlet nozzle 23 to accelerate the flowing medium 14 arriving at the turbine blades 18, thereby allowing the assembly 10 to operate generally at lower speeds of the flowing medium 14 arriving at an inlet 24 of the inlet nozzle 23.

The duct 12 defines a longitudinal direction L, a lateral direction Lat perpendicular to the longitudinal direction L, and a transverse direction T perpendicular to both the longitudinal direction L and the lateral direction Lat. The elongated duct 12 comprises the tapered inlet nozzle 23, an upstream section 25 downstream of the tapered inlet nozzle 23, a turbine section 26 including the turbines 16 immediately downstream of the upstream section 25, and a downstream section 28 immediately downstream of the turbine section 26. The turbine section 26 comprises a pair of opposed semicircular cavities 30, one on each side of the duct 12, which each house part (in this embodiment, about half) of the turbines 16 therein. A top portion 30a of the semicircular cavities 30 may be shaped aerodynamically. In particular a flow divider 30b may be disposed upstream of the semicircular cavities 30. The flow divider 30b is a portion of the enclosure 11 extending transversally beyond the elongated duct 12.

Illustratively, the duct 12 is of rectangular cross section, although in a particular embodiment the duct 12 could be of square, circular or oval cross section. A span Sduct of the elongated duct 12 is defined as a width of the elongated duct 12 in the upstream section 25 in the lateral direction Lat. The span Sduct is smaller than an inlet span Sin of the inlet nozzle 23. Each of the turbines 16 has a span S defined to be the end-to-end blade length (or diameter) of the turbine 16. In one embodiment, the turbines 16 may be positioned to have each about half a span S disposed in the elongated duct 12. In other embodiments, the turbines 16 may be positioned to have more or less than about half a span S each disposed in the elongated duct 12. In one embodiment, the turbines 16 have a same span S. The span Sduct is larger than the combined spans of the turbines 16 extending within the duct 12 such that a gap 27 is defined laterally between the turbines 16. The gap 27 may be minimal. The tribunes 16 may be arranged close to one another such that little of the flowing medium 14 escapes through the gap 27 aiding in rotating the turbine blades 18, thereby improving efficiency. A combined lateral span Sturb of the turbines 16 may be defined between ends of opposed blades of the turbines 16 in the lateral direction Lat. The combined lateral span of the turbines Sturb is the sum of each of the span S of the turbines with the lateral length of the gap 27. The combined lateral span of the turbines Sturb is at least twice of the individual spans S of the turbines 16.

Figure 2:
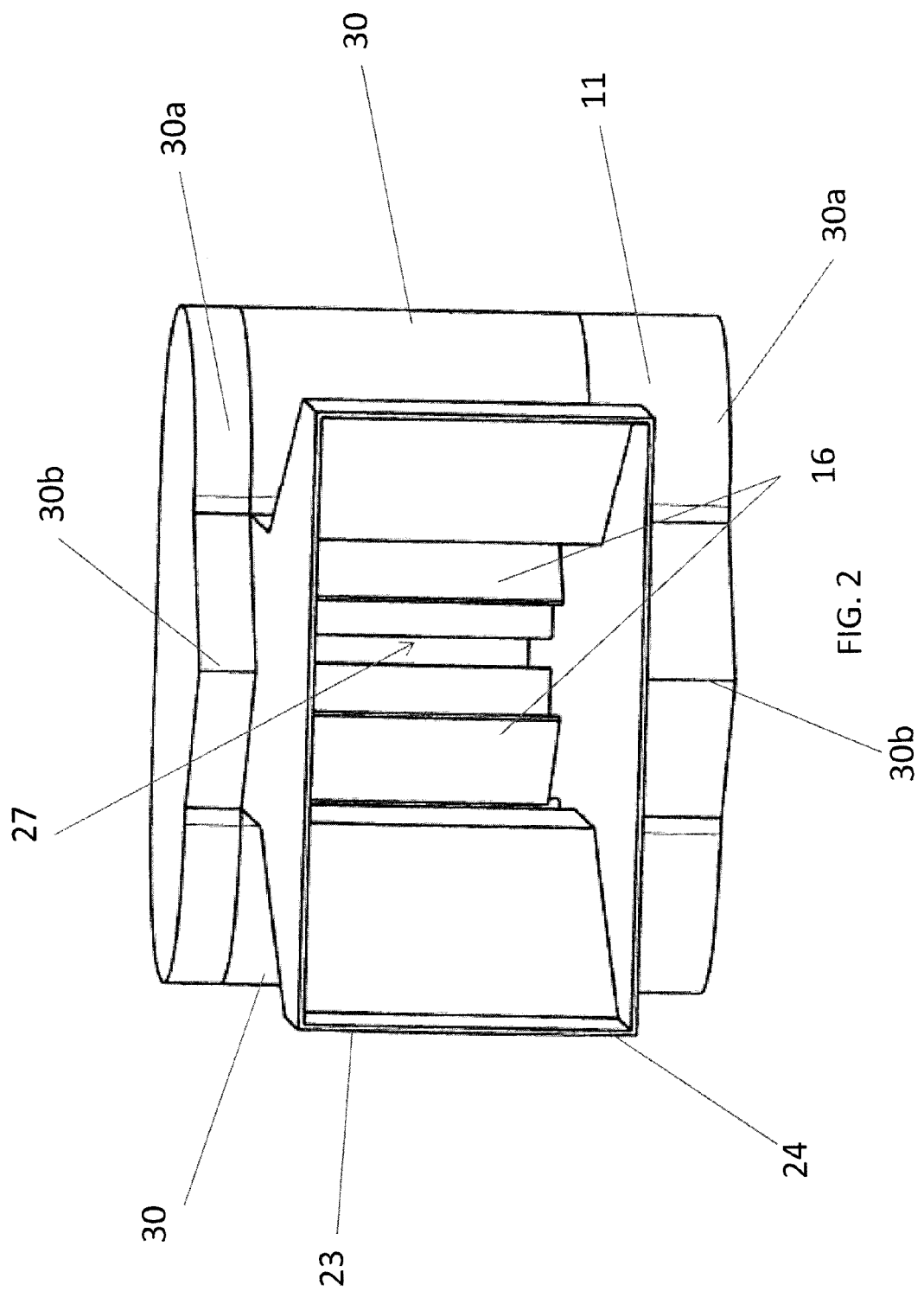
FIG. 2 provides a right front perspective view of the power generating assembly of FIG. 1A.

Referring to FIG. 2 in addition to FIGS. 1A, 1B and 1C, in operation the flowing medium 14 such as wind, enters the tapered inlet nozzle 23 at the inlet 24, then flows over a short distance in the upstream section 25 of the duct 12, before reaching the turbines 16 and providing motive force to the blades 18 of the turbines 16. The flowing medium 14 is subsequently directed along the downstream section 28 which is shaped straight to stabilize the flowing medium 14 before it exits the duct 12 at a rear end or outlet 32 of the duct 12. Stabilizing the flow may include decreasing turbulence in the flowing medium 14 before the outlet 32.

Still referring to FIGS. 1A, 1B and 1C, the power generating assembly 10 of the present invention can be scaled to include the elongated duct 12 and the turbines 16 of any size, for example such that the assembly 10 is suitable of the use in wind farms or the like (not shown), or small enough to be placed on the roof of a house (also not shown). The power generating assembly 10 of the present invention is also suitable for mounting on vehicles or the like (not shown) in order to generate electricity and take advantage of increased speed created by the vehicle. The turbines 16 could be connected to generators which would provide power to the battery or other devices on the vehicle. The combined lateral span of the turbines Sturb may be used to characterize a size of the power generating assembly 10. In one embodiment the combined lateral span of the turbines Sturb is on the other of magnitude of 1 cm. In one embodiment the combined lateral span of the turbines Sturb is on the other of magnitude of 5 cm. In one embodiment the combined lateral span of the turbines Sturb is on the other of magnitude of 10 cm. In one embodiment the combined lateral span of the turbines Sturb is on the other of magnitude of 50 cm. In one embodiment the combined lateral span of the turbines Sturb is on the other of magnitude of 1 m. In one embodiment the combined lateral span of the turbines Sturb is on the other of magnitude of 5 m. In one embodiment the combined lateral span of the turbines Sturb is on the other of magnitude of 10 m.

Figure 3:
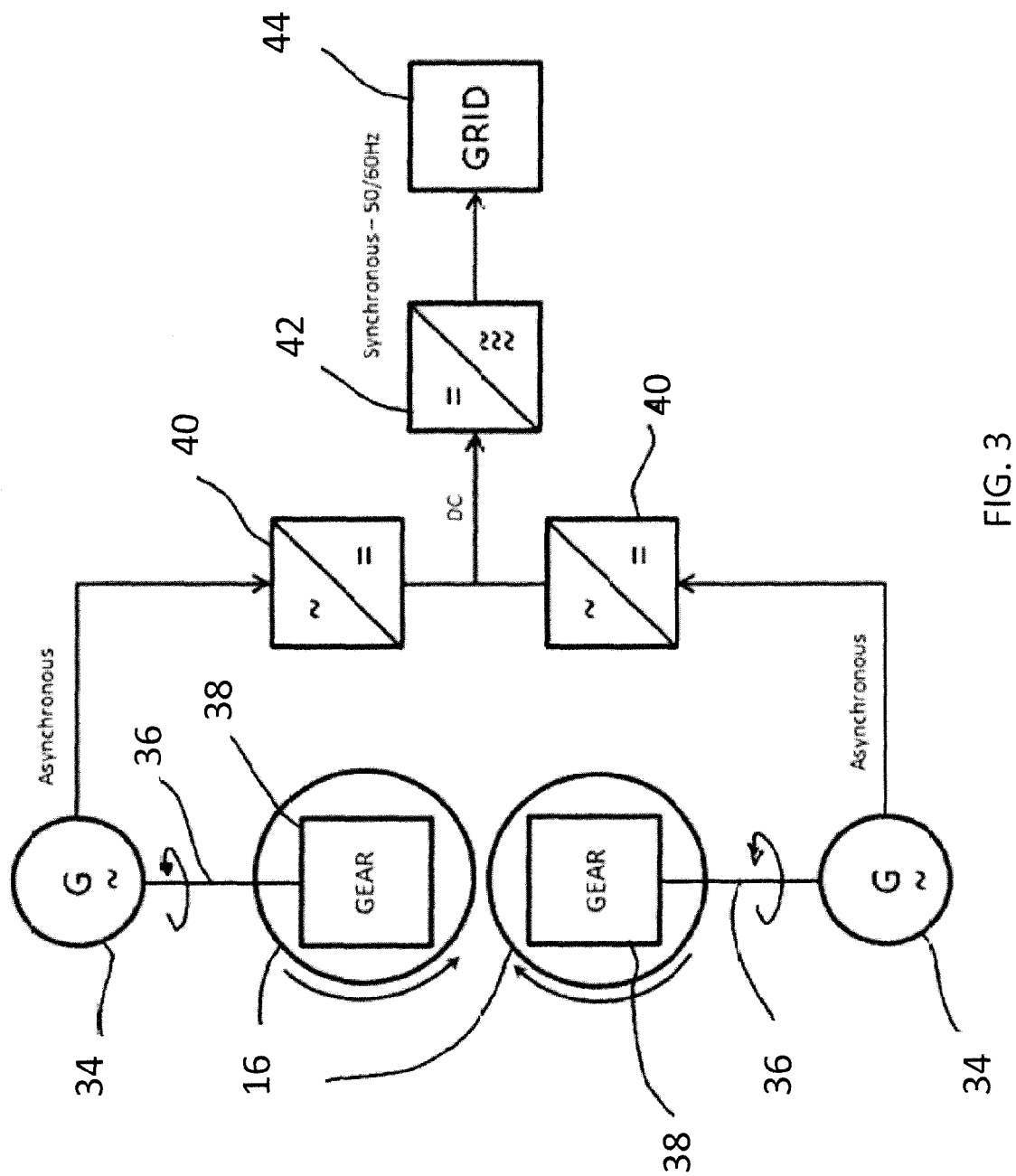
FIG. 3 provides a block diagram of a power generating assembly in accordance with an illustrative embodiment.

Referring now to FIG. 3, in addition to FIG. 1A, each turbine 16 of the power generating assembly 10 may be equipped with a dedicated generator 34. The generator 34 is interconnected to the turbine 16 via a drive shaft 36, for example, and may include a gearbox 38, or the like, for example to reduce or increase the speed or rotation of the drive shaft 36 in a particular application. In a particular embodiment the drive shaft may be replaced by a drive belt or chain or the like (not shown) or the stator (not shown) of the generator 36 attached directly to the turbine shaft 20 for rotation therewith. Note that although the generators 34 are shown as separate from the turbines 16, in a given embodiment the generators may be collocated with the turbines 16 and encased in an appropriate casing (not shown).

Figure 4:
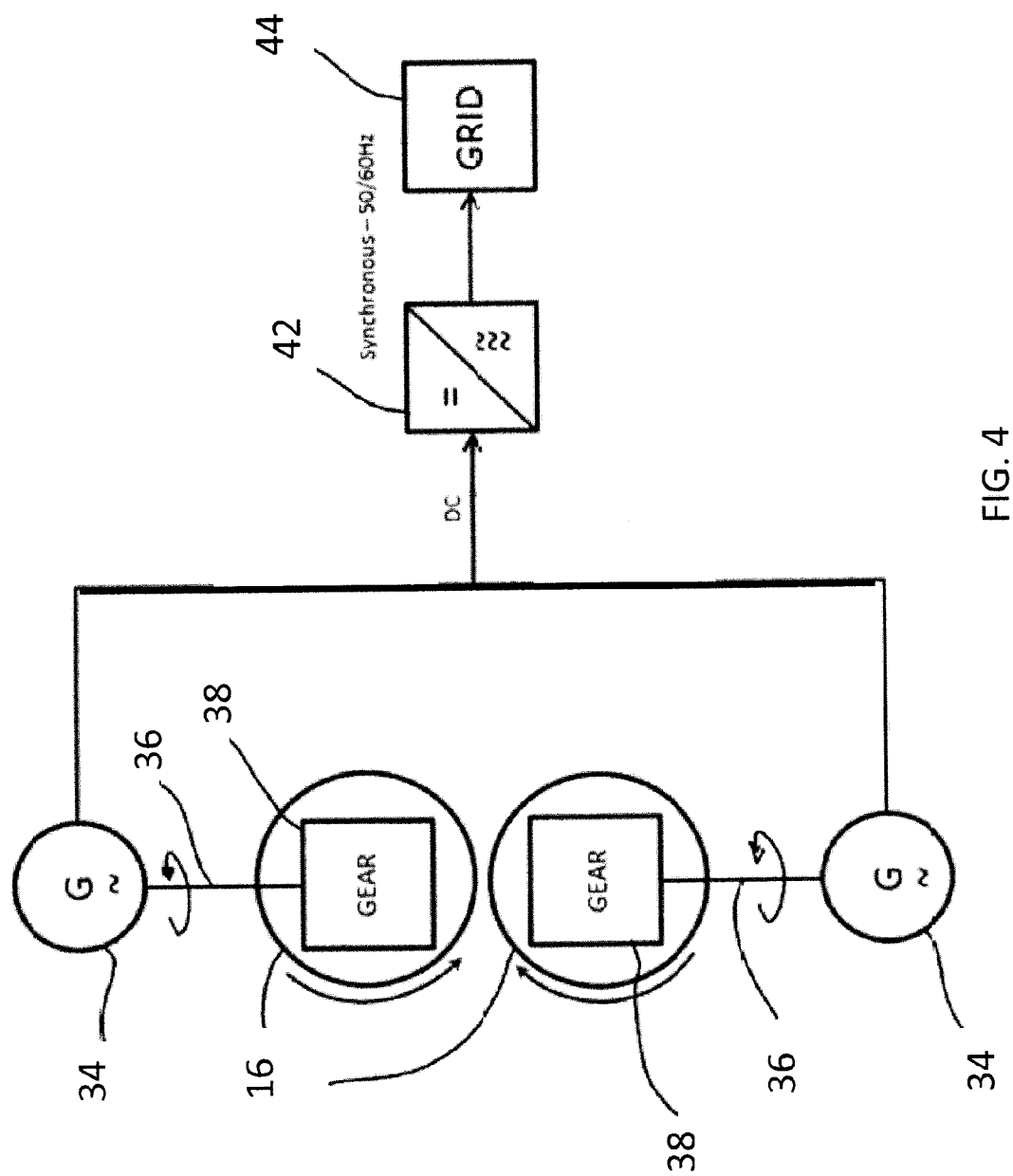
FIG. 4 provides another block diagram of a power generating assembly in accordance with an illustrative embodiment.

Typically, as the speed of rotation of such generators 34 is variable the generators output an asynchronous alternating current (AC) which can be converted to a direct current (DC), for example using a rectifier 40. The DC output of the rectifier 40 can be reconverted to a synchronous AC current using an inverter 42, for example having a cycle of 50 or 60 Hz and a constant regulated voltage. The output of the inverter 42 can be conditioned such that it is suitable, for example, for injection into an electrical power grid 44 or the like. In another embodiment, as shown in FIG. 4, the generators 34 could output a direct current (DC) which can be converted to an asynchronous alternating current (AC). In another embodiment, the generators 34 could output a direct current (DC) which would not be converted to an asynchronous alternating current (AC). The generators 34 could be connected in series or in parallel.

Figure 5:
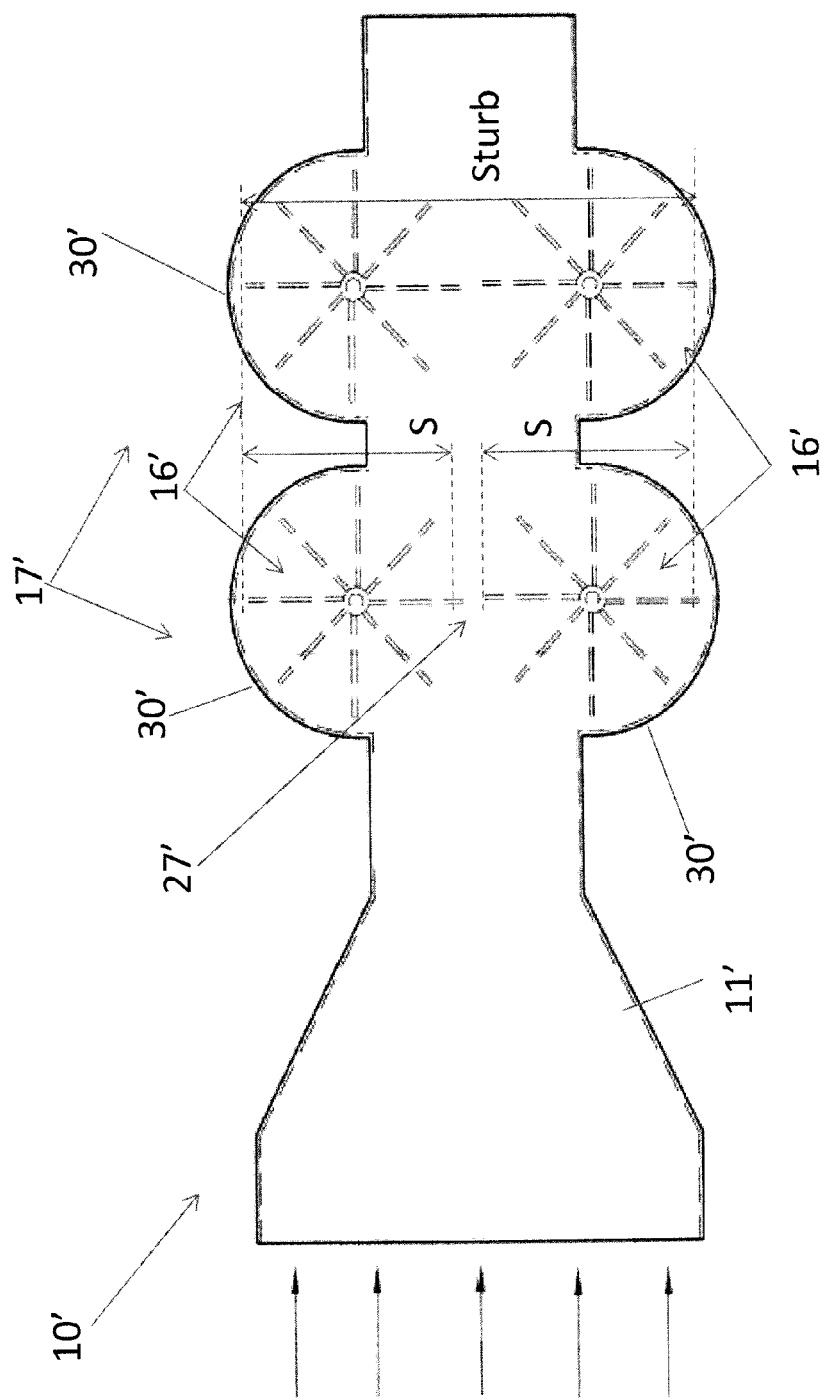
FIG. 5 provides a top cross-sectional view of a power generating assembly in accordance with another illustrative embodiment.

The power generating assembly 10 provided with the requisite seals and the like can be used for example in water or other flowing media to provide hydro generation of electricity. The taper angle at the inlet nozzle 23 can be modified to optimize performance under particular operating conditions. In the embodiment shown in the figures, the turbine 16 is shown with eight straight turbine blades 18. The number of the blades can be modified as well as the shape, size and material used to manufacture the blades 18 and to better accord the blades 18 to particular operating conditions. The power generating assembly 10 may have more than two turbines 16. It could have multiple rows of face-to-face turbines 16. For example, as shown in FIG. 5, a power generating assembly 10' has an enclosure 11' having four semicircular cavities 30' receiving two rows 17' of turbines 16'. The power generating assembly 10' is otherwise similar to the power generating assembly 10'. In the illustrated embodiment, the turbines 16' have a same S, but it is contemplated that the span S of the turbines 16' could vary from one row 17' to another. It is also contemplated that a gap 27' could vary from one row 17' to another.

The power generating assembly 10 can be manufactured from any suitable rigid material, including plastic, steel, carbon fiber, composites and the like and combinations of such materials. The turbines 16 of the power generating assembly 10 can be placed vertically or horizontally. The power generating assembly 10 can be mounted on a pole, for example when used on a wind farm or the like, mounted on a swiveling device when placed on the roof of a building or anchored firmly when mounted on vehicles or other modes of transportation.

Although the present invention has been described hereinabove by way of specific embodiments thereof, it can be modified, without departing from the spirit and nature of the subject invention as defined in the appended claims.

I claim:

1. A power generating assembly for generating electricity from a flowing medium, the assembly comprising:

an elongated duct along which the medium flows, the elongated duct defining an enclosure and comprising a converging inlet nozzle and an outlet, the elongated duct defining a longitudinal direction and a lateral direction;

at least one pair of turbines arranged within the enclosure and on either side of the duct in the lateral direction between the inlet nozzle and the outlet, each turbine rotating about a respective shaft extending in a transverse direction, the transverse direction being perpendicular to the longitudinal direction and the lateral direction, the turbines being rotated in opposite directions by the flowing medium, the turbines being disposed in a face-to-face relationship and spaced from each other in the lateral direction by a gap, the gap being unobstructed to convey therethrough a portion of the flowing medium; and a generator interconnected with each turbine of the at least one pair of turbines via a drive means such that each generator rotates with rotation of the turbines;

each turbine is partially housed in a semi-circular cavity which reduces drag and minimizes the suction effect that would otherwise occur as the medium exits the turbine section, allowing the turbines to rotate more freely whereby increasing efficiency; and wherein each turbine of the at least one of turbines has a diameter, about half the turbine diameter extending into the duct to be rotated by the flowing medium; and wherein the at least one pair of turbines is a first pair of turbines and the power generating assembly includes a second pair of turbines disposed downstream of the first pair of turbines, the second pair of turbines being disposed within and on either side of the duct in the lateral direction, each turbine of the second pair of turbines rotating about a respective shaft, the shafts of the second pair of turbines being parallel and extending in a transverse direction to the longitudinal direction and the lateral direction, the turbines being rotated in opposite directions by the flowing medium; and the first and second pair of turbines are directly opposite each other and at equal distance from the inlet, having even distribution of flow of the medium through each turbine and the turbines are directly opposite to each other; and further comprising a stabilizing portion of the elongated duct for decreasing turbulence in the flowing medium, the stabilizing portion being straight and disposed downstream of the turbines.

2. The power generating assembly of claim 1, wherein each generator interconnected with each turbine is collocated with the corresponding turbine.

3. The power generating assembly of claim 1, wherein a combined lateral span of the at least one pair of turbines is in the order of magnitude of 10 cm.

4. The power generating assembly of claim 1, wherein a combined lateral span of the at least one pair of turbines is in the order of magnitude of 10 m.

5. The power generating assembly of claim 1, wherein the elongated duct has at least one portion extending in the transverse direction, said portion being aerodynamically shaped.

6. The power generating assembly of claim 1, wherein the inlet nozzle and the outlet are the only two openings of the enclosure.

7. The power generating assembly of claim 1, wherein an output of the generators is an asynchronous alternating current.

8. The power generating assembly of claim 7, wherein the output of the generators is converted to a direct current by a rectifier.

9. The power generating assembly of claim 8, wherein the direct current is converted to an asynchronous alternating current by an inverter for delivering the current to a power grid.

10. The power generating assembly of claim 1, wherein an output of the generators is a direct current.

11. The power generating assembly of claim 1, wherein the elongated duct has a rectangular cross-section.

\* \* \* \* \*